United States Patent
Stevenson et al.

(10) Patent No.: US 8,075,240 B2
(45) Date of Patent: Dec. 13, 2011

(54) TARPING SYSTEM FOR FLATBED TRAILERS

(76) Inventors: Bryce Stevenson, Langley (CA); Murray Trudel, Kelowna (CA)

( * ) Notice: Subject to any disclaimer, the term of this patent is extended or adjusted under 35 U.S.C. 154(b) by 627 days.

(21) Appl. No.: 12/213,861

(22) Filed: Jun. 25, 2008

(65) Prior Publication Data

US 2009/0041571 A1 Feb. 12, 2009

Related U.S. Application Data

(60) Provisional application No. 60/937,085, filed on Jun. 26, 2007.

(51) Int. Cl.
*B66F 9/18* (2006.01)
(52) U.S. Cl. .................................................... 414/607
(58) Field of Classification Search .................. 414/607; 410/97, 98
See application file for complete search history.

(56) References Cited

U.S. PATENT DOCUMENTS

| | | | |
|---|---|---|---|
| 2,558,388 A | 6/1951 | Richardson | |
| 2,696,317 A | 8/1952 | Toffolon | |
| 3,204,798 A | 9/1965 | Becker | |
| 3,552,583 A * | 1/1971 | Toffolon | 414/10 |
| 3,854,616 A * | 12/1974 | Willis et al. | 414/607 |
| 3,947,064 A * | 3/1976 | Skoting | 294/67.4 |
| 4,342,480 A | 8/1982 | Ross, Jr. | |
| 4,842,323 A | 6/1989 | Trickett | |
| 4,927,317 A | 5/1990 | Acosta | |
| 5,007,672 A | 4/1991 | Koch | |
| 5,088,577 A * | 2/1992 | Pierce | 182/179.1 |
| 5,338,084 A | 8/1994 | Wardell | |
| 5,486,083 A * | 1/1996 | Thompson | 414/607 |
| 5,769,105 A * | 6/1998 | Margol et al. | 135/90 |
| 5,964,236 A | 10/1999 | Berke | |
| 6,149,373 A * | 11/2000 | Gesuale | 414/607 |
| 6,273,401 B1 | 8/2001 | Payne | |
| 6,347,826 B1 | 2/2002 | Horner et al. | |
| 6,502,709 B1 | 1/2003 | Parker | |
| 6,634,850 B2 | 10/2003 | Christensen | |
| 6,811,202 B2 | 11/2004 | Hornady | |
| 6,824,189 B1 | 11/2004 | Crabb | |
| 7,182,387 B2 | 2/2007 | Hartman et al. | |
| 7,641,435 B1 * | 1/2010 | Kelly | 414/607 |
| 2001/0000464 A1 * | 4/2001 | Beale | 414/607 |

OTHER PUBLICATIONS

U.S. Appl. No. 11/312,226, filed Jun. 21, 2007, Miller.

* cited by examiner

*Primary Examiner* — Charles A Fox
(74) *Attorney, Agent, or Firm* — Antony C. Edwards

(57) ABSTRACT

An assembly including a frame is attached to the fork carrier of a forklift. The assembly picks up a tarp to cover the cargo on a flatbed trailer or picks up a plurality of straps to position the straps over the cargo. The tarp or straps are secured under the frame on the assembly and the forklift elevates the frame and tarp or straps above the cargo and drapes the tarp or straps over the cargo by firstly driving along side the trailer and secondly lowering the frame.

16 Claims, 8 Drawing Sheets

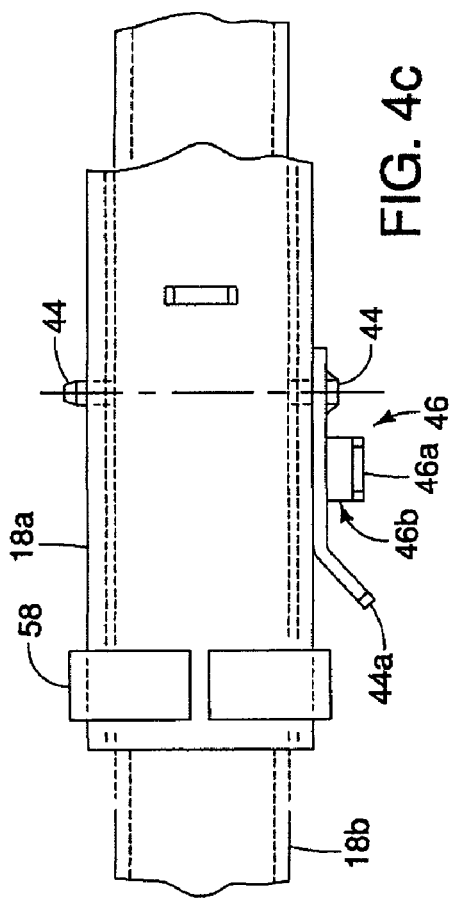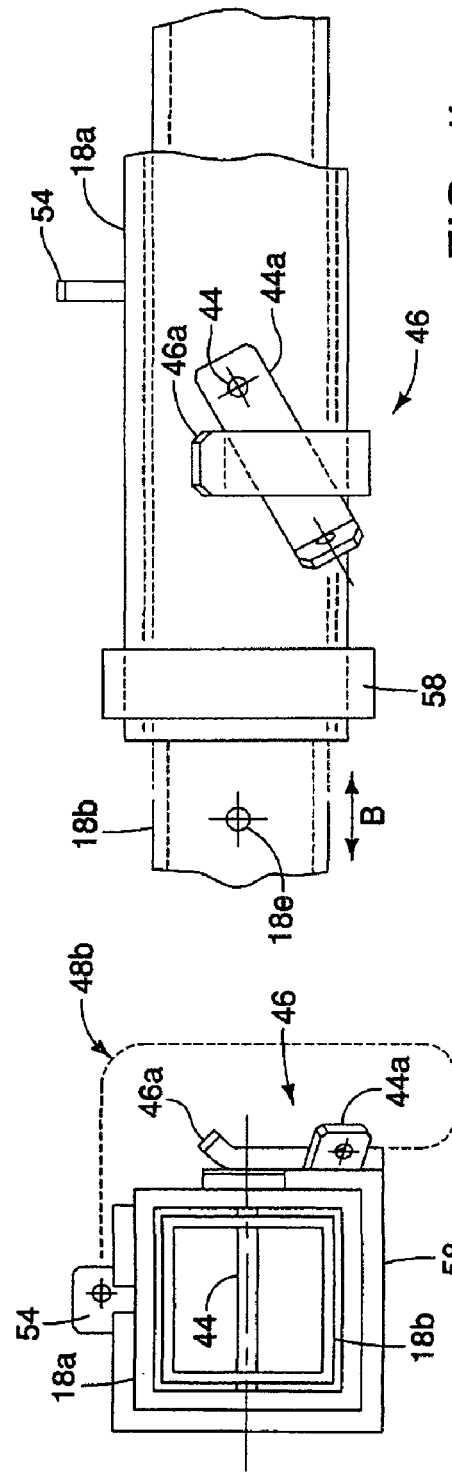

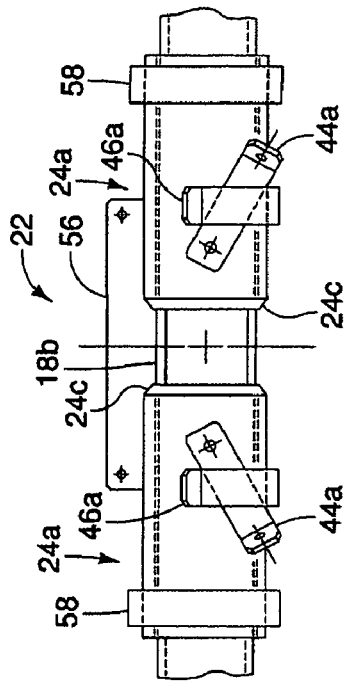
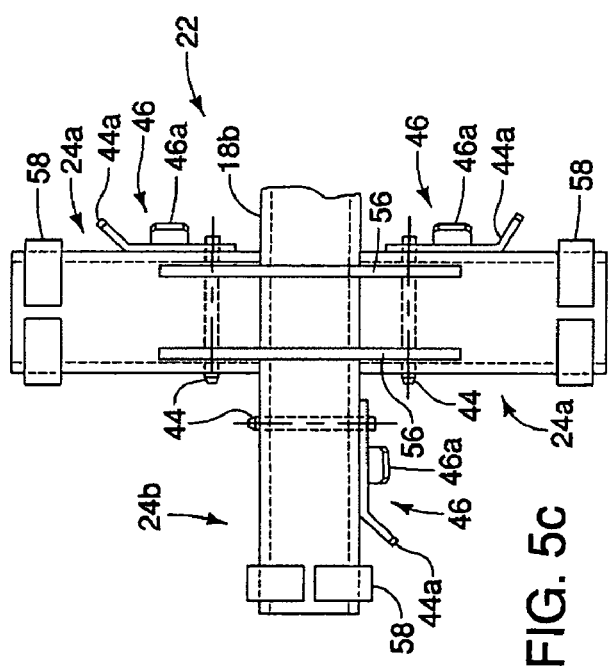
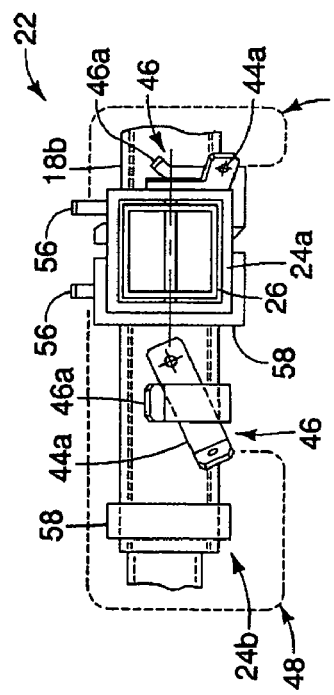

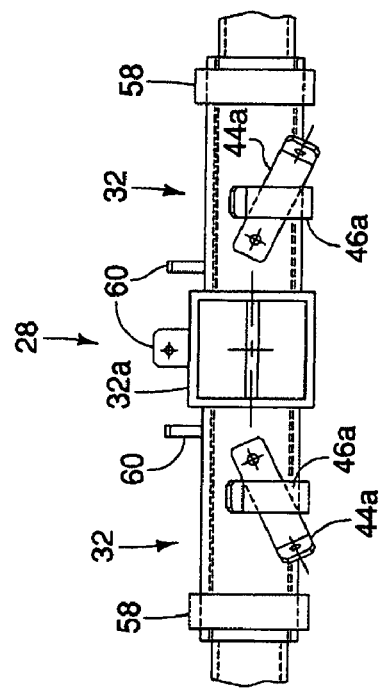
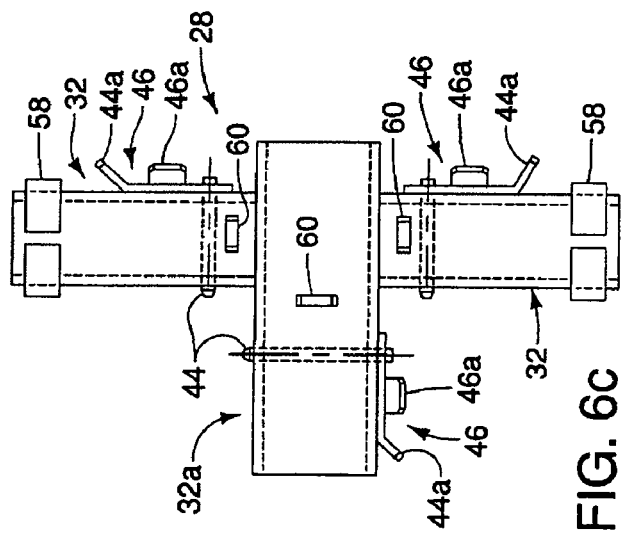
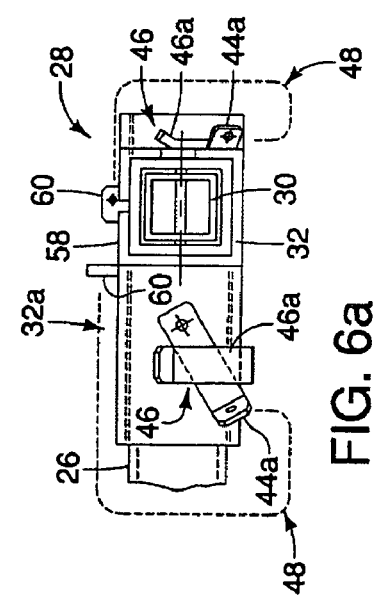
FIG. 6a
FIG. 6c
FIG. 6b

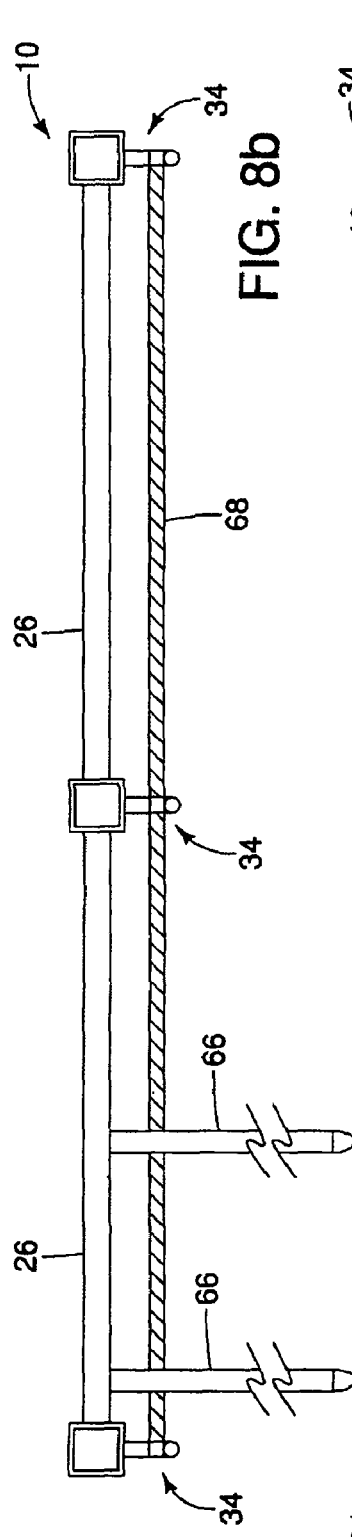
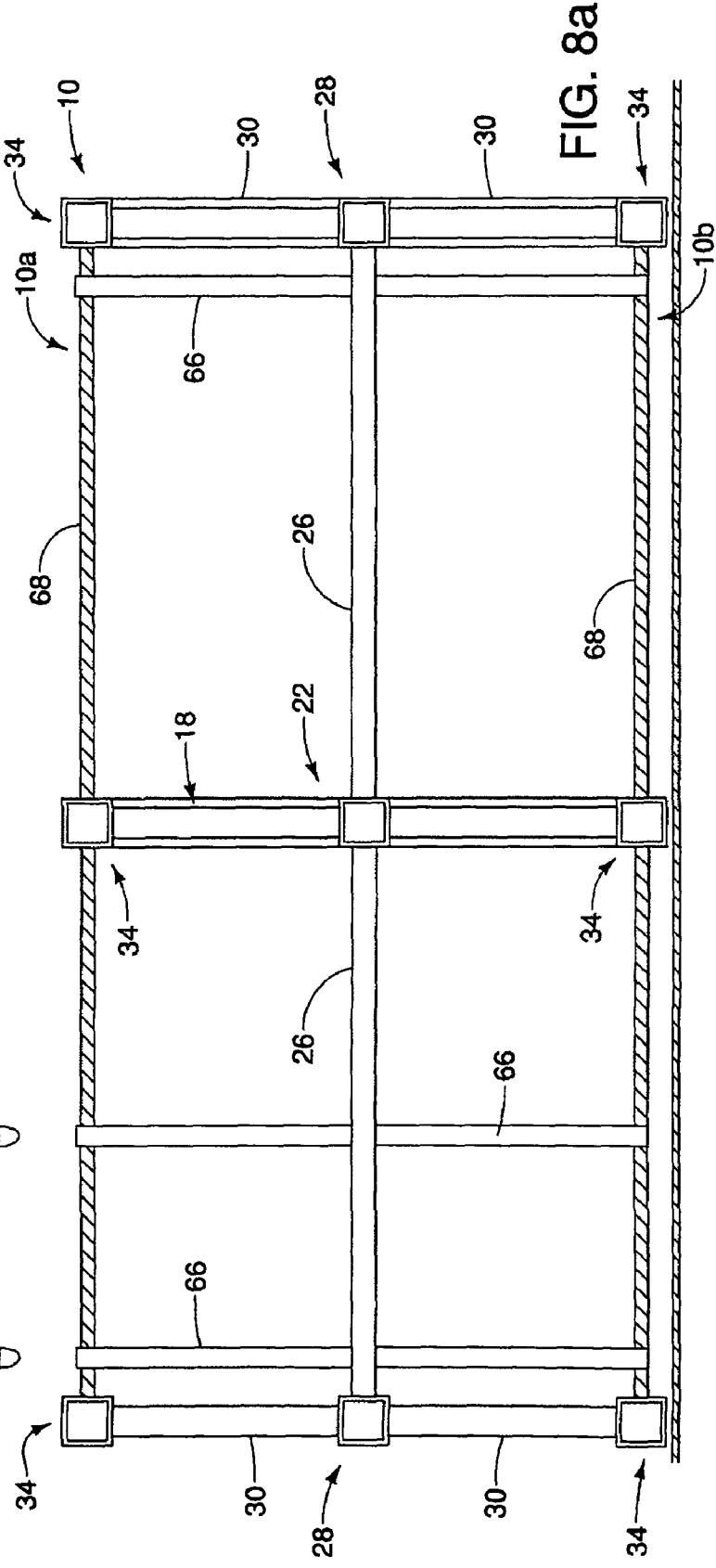

TARPING SYSTEM FOR FLATBED TRAILERS

CROSS REFERENCE TO RELATED APPLICATION

This application claims priority from U.S. Provisional Patent Application No. 60/937,085 filed Jun. 26, 2007 entitled Tarping System for Flatbed Trailer.

FIELD OF THE INVENTION

This invention relates to the field of devices that assist the operators of flatbed trailers in covering loads on the flatbed trailers and in particular to a cantilevered frame device which mounts to a forklift so as to assist in the placing of both tarps so as to cover a load on a flatbed trailer and straps to cover the tarps.

BACKGROUND OF THE INVENTION

Cargo transported by flatbed trailer is exposed to the elements during transit and frequently requires protection from contaminants. A tarp is commonly employed to cover the cargo in order to prevent damage from the elements during transit. It is also common to use straps, often not in conjunction with tarps, to cover a load.

The most common tarping or strapping approach is a manual method which requires the operator to physically place and secure the tarp or straps over the cargo. This process is not only difficult and strenuous, but can also be a safety hazard as the operator can fall off the cargo while attempting to locate and secure the tarp or straps. In the case of tarping, in order to reduce the risk of injuries, tarping stations have been implemented which provide an anchoring tether which secures the operator from falling. The drawback of these stations is that they are cumbersome to use and require extra time to restrain the operator before use. To alleviate the drawbacks of the tarping station, automatic tarping systems have been introduced that are directly attached to the trailer. While automatic tarping systems are efficient at preventing injuries from falls, there are other restrictions that make these systems less desirable. The automatic tarping systems tend to become entangled in the cargo during transit making it extremely difficult to un-tarp at the end of the trip. Furthermore, the auto-tarping systems are very expensive to repair if damaged.

It is clear that a tarping or strapping system that prevents injuries from falls, operates reliably and consistently without costly repairs would be advantageous over current systems.

Accordingly, it is an object of an embodiment of the present invention to provide an assembly that will enable operators to tarp or strap their cargo safely, efficiently and economically. Other objects of the invention will be apparent from the description that follows.

It is recognized in the prior art of which applicant is aware, for example in U.S. Pat. No. 7,182,387 which issued to Hartman et al on Feb. 27, 2007, that in the past it has been potentially hazardous for operators to climb up onto loads on their flatbed trailers so as to drag tarps over the loads so that the tarps may be secured to protect the load during transport and storage. Thus as taught in the Hartman patent, it is know in the prior art to provide a cantilevered frame which mounts to a forklift so as to extend laterally from the side of the front of the forklift. As taught by Hartman, with the frame in a lowered position an operator may walk on top of the frame so as to spread out a tarp which the operator desires to use to cover his load. Once the front of the tarp has been placed over top of the lowered frame and secured thereto, the frame may be elevated thereby carrying with it the front of the tarp. Once the frame and front of the tarp has been elevated above the elevation of the top of the load on the flatbed trailer, the forklift may be driven forward along the side of the flatbed trailer so as to translate the front of the tarp across the top of the load thereby dragging the rear of the tarp up onto the load as it trails behind the frame.

The problem with the approach of Hartman, in applicant's experience, dragging a tarp up the back of a flatbed trailer and up across the back of a load on top of the flatbed trailer, will sometimes cause the tarp to snag, requiring the operator to free the tarp for the load covering may be continued. Further, once the front of the tarp has been moved into its desired position, the tarp must be released from where it is secured to the frame, and the frame slid or pulled out from underneath the front of the tarp thereby also potentially dislodging the position of at least the front of the tarp on the load. Consequently what is desired, and which it is an object of the present invention to provide, is a frame which, once mounted to the forklift and in particular to the top of the fork carriage, so as to cantilever the frame laterally outwardly from the side of the forklift, is adapted to releasably secure a tarp underneath the frame and to carry a significant portion of a tarp if not the entire tarp then upwardly clear of the top of the load by the elevation of the frame on the forklift. With the frame and the tarp suspended underneath the frame lifted by the forklift so as to be clear of the top of the load on the flatbed trailer, the entire tarp may be then carried over and gently lowered so as to place the tarp onto the load rather than dragging the tarp over the load and the end of the trailer.

SUMMARY OF THE INVENTION

This invention consists of an assembly that can easily be attached to a forklift and can pick up a tarp and cover the cargo on a flatbed trailer or can pick up a plurality of straps simultaneously to position the straps over the cargo. The tarp or straps are secured to a frame assembly and the forklift elevates the frame assembly and tarp or straps above the cargo and drapes the tarp or straps over the cargo by driving along side the trailer.

In summary, the tarping or strapping system for placing a tarp having four opposite corners or an array of adjacent substantially parallel straps down onto a load on a flatbed trailer according to the present invention may be characterized in one aspect as including:
   a) a beam having opposite first and second ends and adapted to be mountable at the first end of the beam to a fork carriage of a forklift so as to be elevatable along with the carriage upon elevation of the carriage,
   b) an oppositely disposed pair of rigid elongate primary support members, each having opposite first and second ends, mounted at the first ends to the beam so as to extend perpendicularly and substantially horizontally therefrom in oppositely disposed directions,
   c) a pair of rigid, elongate secondary support members mounted at the second ends of the primary support members so as to extend therefrom substantially parallel with the beam and substantially co-planar with the beam and the primary support members, the pair of secondary support members having opposite distal ends on each secondary support member,
   d) releasable tarp suspension means such as hooks, clamps, rings, fasteners, etc. mounted on the distal ends of the secondary support members for releasably suspending the four opposite corners of a tarp therefrom so as to suspend the tarp below said beam, and the primary and secondary support members when the frame use is used in a tarping application.

In one embodiment not intended to be limiting, the tarp suspension means includes a rigid upstanding member at each of the distal ends for hooking onto mounts on corresponding corners of the tarp. For example, each upstanding member may be a hook.

In a preferred embodiment each of the pair of secondary support members is itself an oppositely disposed pair of elongate rigid arms. Further, advantageously the beam is linear and the pairs of primary and secondary support members are co-linear. In the preferred embodiment mid-section tarp suspension means mounted spaced apart along the beam so as to suspend a mid-section of the tarp from the beam. For example, the mid-section tarp suspension means may include a pair of rigid upstanding members for hooking mounts on opposite sides of the mid-section of the tarp. The pair of rigid upstanding members may be a pair of hooks.

In one embodiment the beam may include a primary beam and a beam extension. The primary beam and the beam extension may be joined at a center junction by joining means. The first ends of the primary support members may also be mounted to the center junction by the joining means. The joining means may be a radially spaced apart array of pockets, equally radially spaced apart in a plane containing the beam and the primary support members. A further pair of radially spaced apart pockets may form end-junctions on the second ends of the primary support members for mounting thereon of the secondary support members.

In a strapping application a pair of strap support members may be mounted to the tarp suspension means substantially parallel to the primary support members. For example, the strap support members may be elongate flexible members such as cables suspended from the distal ends.

BRIEF DESCRIPTION OF THE DRAWINGS

In the drawings wherein similar characters of reference denote corresponding parts in each view:

FIG. 3b is a partially cut-away right side elevation view of the sectional view of FIG. 3a.

FIG. 3c is a partially cut-away plan view of the sectional view of FIG. 3a.

FIG. 4a is a sectional view along line 4a-4a in FIG. 2.

FIG. 4b is a partially cut-away right side elevation view of the sectional view of FIG. 4a.

FIG. 4c is a partially cut-away plan view of FIG. 4b.

FIG. 5a is a partially cut-away sectional view along line 5a-5a in FIG. 1.

FIG. 5b is a partially cut-away right side elevation view of the sectional view of FIG. 5a, being a sectional view along line 5b-5b in FIG. 1.

FIG. 5c is a plan view of the sectional view of FIG. 5a.

FIG. 6a is a partially cut-away sectional view along line 6a in FIG. 1.

FIG. 6b is a partially cut-away right side elevation view of the sectional view of FIG. 6a.

FIG. 6c is a plan view of the sectional view of FIG. 6a.

FIG. 8a is, in plan view, the frame of FIG. 1 adapted for carrying straps so as to position the straps over a load.

FIG. 8b is, in side elevation view, the adapted frame of FIG. 8a.

DETAILED DESCRIPTION OF EMBODIMENTS OF THE INVENTION

Figure 1:
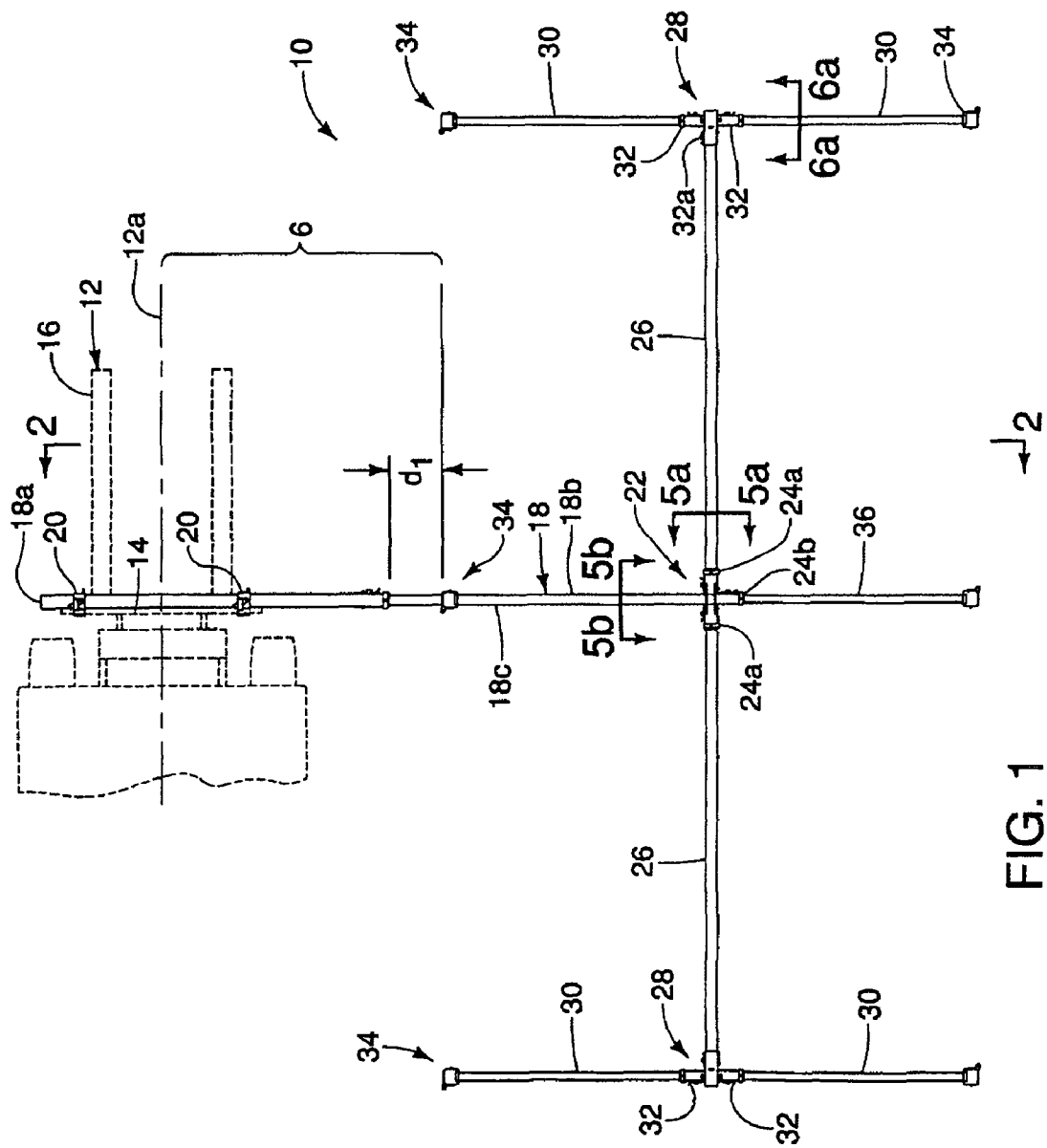
FIG. 1 is, in plan view, the cantilevered tarping frame according to one embodiment of the present invention mounted to a forklift.

As seen in the accompanying figures wherein similar characters of reference denote corresponding parts in each view, cantilevered frame 10 according to the present invention is mounted to a forklift 12, and in particular to a top crossbar 14 of the forklift carriage frame 16.

Although not intended to be limiting, frame 10 may define a rectangle which is approximately 17 feet long and 9 feet wide. Hooks are mounted on the corners of the frame and across the midsection of the frame.

In a tarping application a tarp is suspended underneath the frame by mounting of the tarp on the hooks. The hooks may be mounted on re-positionable sleeves which are slidably mounted on arms of the frame so that the hooks may be positioned to accommodate tarps of different sizes. The frame may be positioned a desired set-off distance 6 from the forklift by a telescopically adjustable beam extending between the forklift and the frame. The set-off distance may for example be between approximately 4 to 5 feet relative to the centreline 12a of the forklift, where in the illustrated example the beam is adapted to telescopically adjust a distance $d_1$ of approximately 12 inches in length. To support the cantilevered length of the beam, the beam may for example have a square cross-section and be hollow, having walls which are ¼ inch thick and 2 inches in outside diameter. Pockets supporting lengths of 1½-2 inch diameter square cross-section tubes which are mounted to the beam may for example have ¼ inch thick walls and have an outside diameter of 2-2½ inches respectively. The pockets may be approximately 4-5 inches long.

Cantilevered frame 10 is supported cantilevered laterally relative to the forklift on a primary support member 18. Primary support member 18 is a telescoping but otherwise rigid elongate tube structure which extends from end 18a mounted to the forklift to an opposite cantilevered end 18b. Forklift end 18a is releasably clamped for example by clamps 20, better described below, to crossbar 14. Cantilevered end 18b terminates in a crossjunction 22. Cross-junction 22 includes a rigidly spaced apart orthogonal array of pockets 24a and 24b lying in the plane A containing cantilevered frame 10. In particular, a pair of oppositely disposed pockets 24a support a pair of oppositely disposed longitudinally extending support tubes 26. The opposite ends of the pair of support tubes 26 support T-junctions 28 from which extend lateral supporting tubes 30. The inner ends of the pair of lateral supporting tubes 30 mount in pockets 32 in junction 28. A further lateral supporting tube 36 is mounted in pocket 24b in junction 22 so as to extend linearly from member 18. The combination of the pairs of lateral supporting tubes 30 on the longitudinally opposite ends of the pair of longitudinal support tubes 26 provide a framework for supporting the corners of a tarp 8, see in FIG. 2, when the tarp is secured to hooks 34 for example by means of D-rings 8a mounted in grommets or eyes formed in the tarp. With the tarp supported at its corners on hooks 34 on the ends of lateral supporting tubes 30, the midsection of the tarp is supported on a further pair of hooks 34 mounted, respectively, on the distal end of lateral tube 36, distal from junction 22, and on a midsection 18c along member 18.

As seen in better detail in FIGS. 2, 3a, 3b and 3c, each clamp 20 includes a U-shaped collar 38 which fits snugly over cross-bar 14 of carriage frame 16 and is releasably secured thereto by means of pin 40. The tubular sleeve 42 is rigidly mounted as by welding onto the top surface 38a of collar 38. Sleeve 42 is sized to receive primary support member 18 slidably journalled through the sleeve so as to extend closely adjacent to and parallel with cross-bar 14 and secured thereto by a pair of clamps 20. The lateral position of each of the clamps 20 is adjusted by pins 44 engaging through one of a linearly spaced apart array of corresponding holes 18d spaced apart along end 18a of primary support member 18.

Pins 44 are releasably secured in holes 18d by a latch mechanism 46. In the example illustrated, which is not intended to be limiting, latch mechanism 46 includes a latch arm 44a rigidly mounted to one end of pin 44 so that, with pin 44 engaged fully through a hole 18d, latch arm 48a may be rotated so as to engage a latch hook 46a rigidly mounted to collar 38 and upwardly extending so as define a latch arm receiving slot 46b between latch hook 46a and the corresponding wall of sleeve 42.

A pair of chains 48a and 48b (shown in dotted outline in FIG. 3a) may be provided to secure the upper end of pin 40 and in particular so as to extend from hole 40a in pin 40 to a hole 50a in flange 50, and so as to extend from hole 44b in latch arm 44a to hole 50b in flange 50 respectively.

Figure 3B:
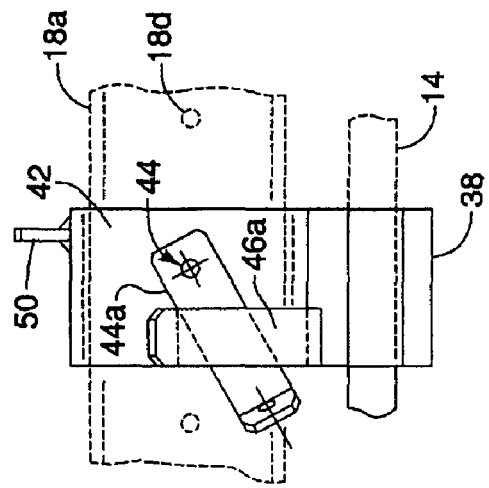
Figure 3C:
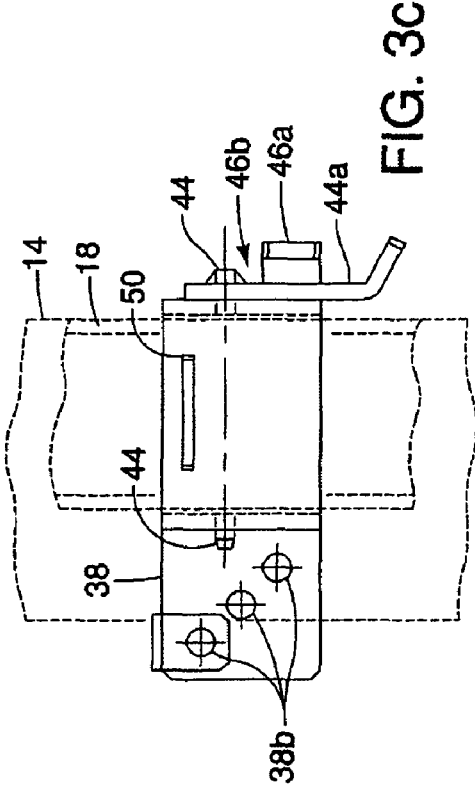
Figure 3A:
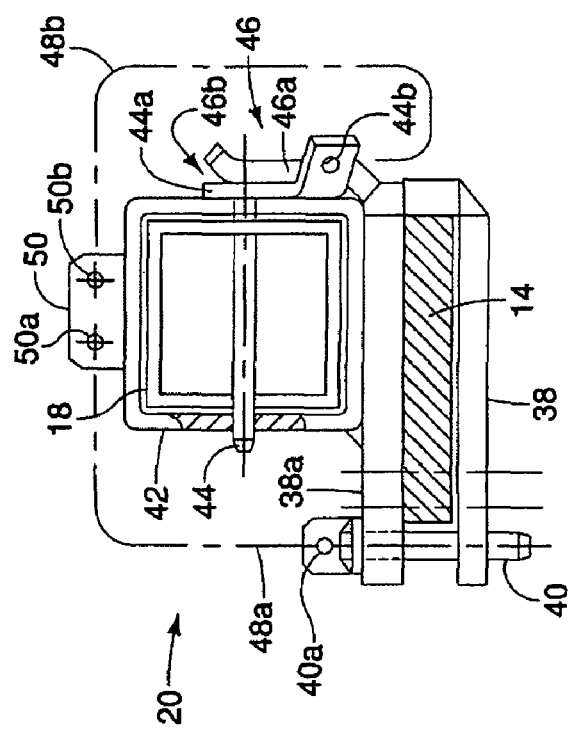
FIG. 3a is a sectional view along line 3a-3a in FIG. 2.

As best seen in FIG. 3c, collar 38 may include a spaced apart array of sizing holes 38b for example, as illustrated, arranged diagonally across collar 38 so as to allow pin 40 to be inserted through the holes 38b corresponding to the width of cross-bar 14.

As seen in FIGS. 4a, 4b and 4c the mid-section 18c of primary support member 18 may employ a telescopic coupling 52 thereby providing for the telescopic sliding of the smaller diameter end 18b snugly into the correspondingly larger diameter end 18a where those two sections of primary support member 18 overlap in midsection 18c. Thus with end 18b slidably journalled into end 18a, end 18b may be slid in direction B relative to end 18a to adjust the lateral extension of hooks 34 relative to the forklift carriage frame 16. In this fashion, tarp 8 may be positioned desirably directly over a load (not shown) even though the set-off distance between the side of the trailer and the load may vary between loads.

In a similar fashion to the positioning latch mechanism 46 employed for positioning clamps 20, latch mechanism 46 may be employed to releasably secure a pin 44 through one of a linear array of holes 18e in a length of end 18b within midsection 18c so that the lateral length of end 18b extending from telescopic coupling 52 may be adjusted. Again, a latch arm 44a engages into a latch slot 46b defined between a latch hook 46a and the adjacent wall of the structure, in this case, the adjacent wall of end 18a. Again, a small chain 48b may secure latch arm 48a to a flange, in this case flange 54.

As seen in FIGS. 5a, 5b and 5c, junction 22 includes 3 orthogonally spaced apart co-planar pockets which include an oppositely disposed pair of pockets 24a and an orthogonal pocket 24b. Pockets 24a and 24b are sized to snugly receive journalled slidably into the pocket the corresponding support members, namely, longitudinal support tubes 26 and lateral support tube 36 respectively. As may be seen best in FIG. 5c, pocket 24b may be formed in the distal end of cantilevered end 18b of primary support member 18. Pockets 24a may be mounted co-linearly on opposite sides of cantilevered end 18b for example by means of welding, as by welds 24c, and by means of top flanges 56.

Each of the pockets and also the open end of end 18a of primary support member 18 includes a strengthening collar 58 mounted around the opening. As before, a pin and latch mechanism 44, 46 is employed to retain the various support tubes in their corresponding pockets. Thus a latch mechanism 46 as described above, and corresponding pin 44 including latch arm 44a, is mounted adjacent the juncture of pockets 24a and 24b so as to retain in those pockets support tubes 26 and 36 respectively, pins 44 releasably engaging corresponding holes in the ends of the support tubes so as to secure the support tubes into the pockets. Again small chains 48 may be provided so as to secure pins 44 to flanges 56.

As seen in FIGS. 6a, 6b and 6c, each T-junction 28 includes an oppositely disposed pair of pockets 32 in which are journalled lateral supporting tubes 30 which are snugly slidably mounted into pockets 32. The oppositely disposed pair of pockets 32 are mounted co-linearly on opposite sides of a longitudinally aligned center pocket 32a. Center pocket 32a mounts onto the end of a corresponding longitudinal support tube 26. Again, the support tubes are releasably mounted into the pockets by latch mechanism 46 and pin 44 including latch arm 44a. As before, small chains 48 may secure pins 44 via latch arms 44a to flanges mounted on the pockets, such as flanges 60.

Figure 2:
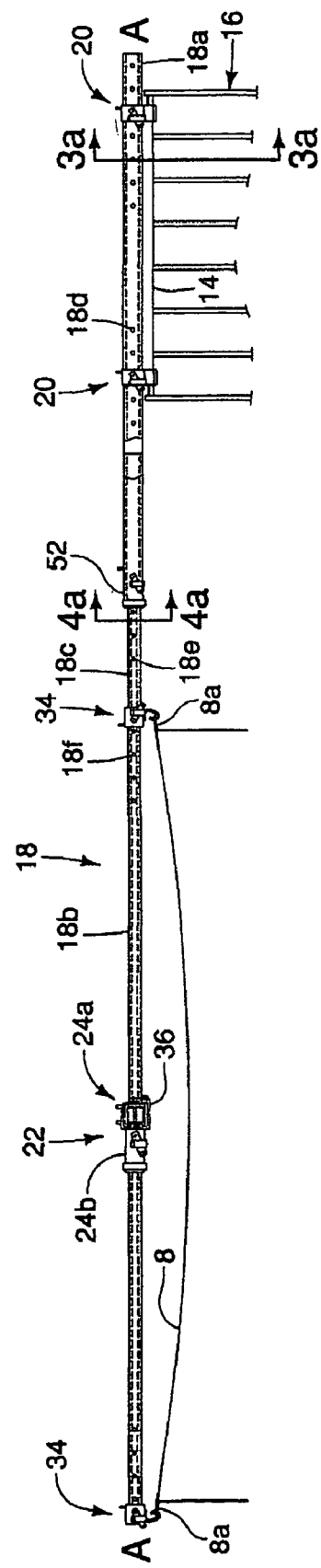
FIG. 2 is a sectional view along line 2-2 in FIG. 1.
Figure 7B:
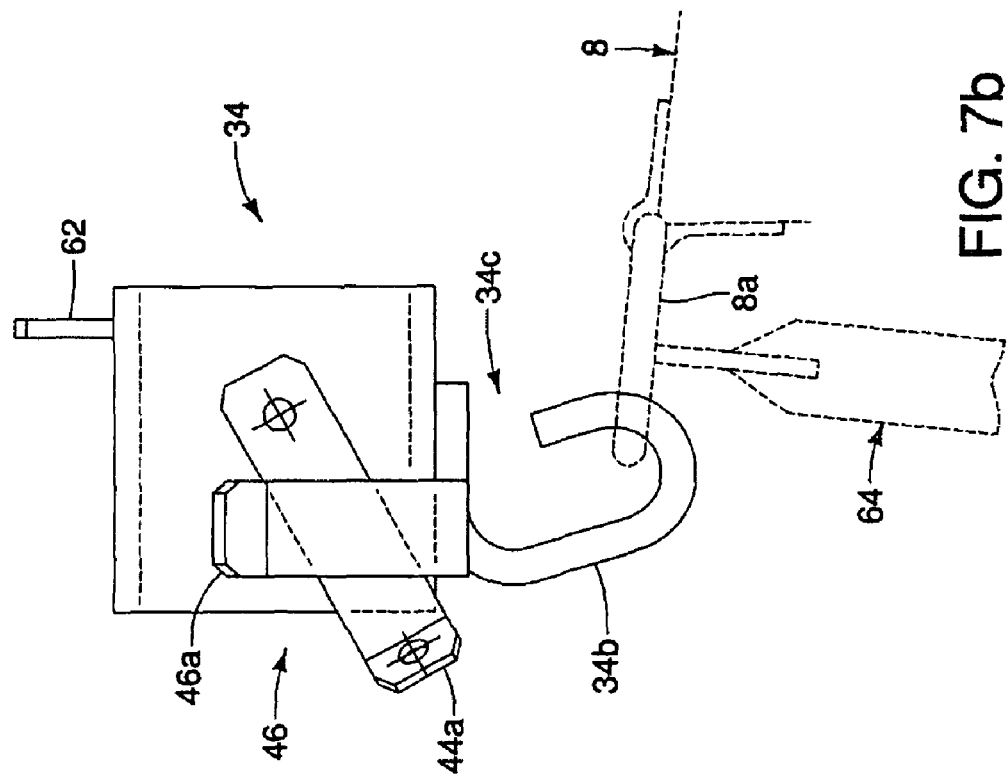
FIG. 7b is a right side elevation view of the hook assembly of FIG. 7a also illustrating a tarp mounted to the hook and an ejection pole engaging the tarp D-ring to disengage the D-ring from the hook.
Figure 7A:
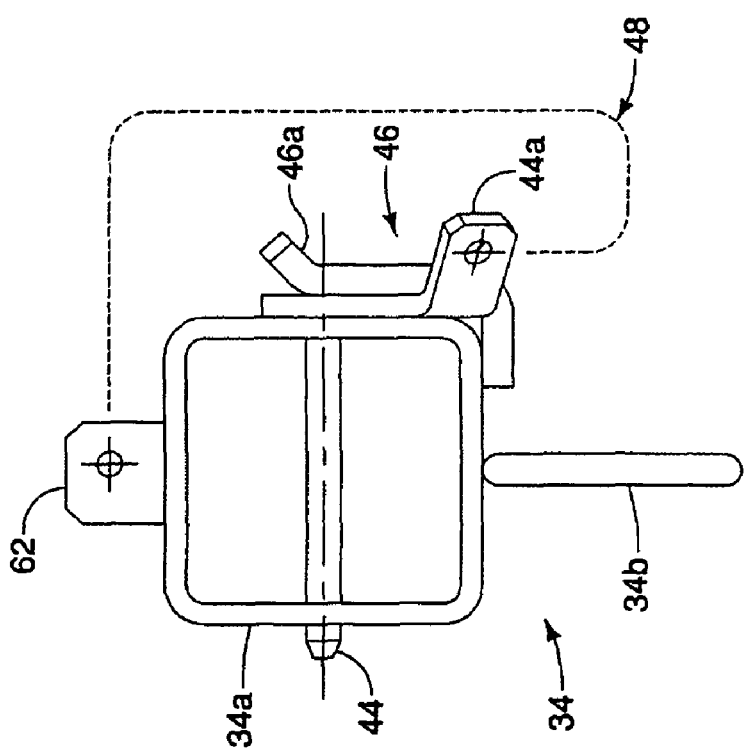
FIG. 7a is a front elevation view of the hook assembly according to one aspect of the present invention.

As seen in FIGS. 7a and 7b, hook assemblies 34 include hook collars 34a sized to slidably mount over their corresponding support tube so that hooks 34 for supporting the corners of tarp 8 snugly slide onto the ends of lateral supporting tubes 30, and hooks 34 for supporting the midsection of tarp 8 are sized for snug sliding onto the end of lateral supporting tube 36 and onto the end of cantilevered end 18b of primary support member 18 where end 18b is adjacent midsection 18c. In the latter, hook collar 34a may be adjusted in its position along support member 18 by the use of a latch mechanism 46 and corresponding pin 44 including latch arm 44a engaging one of a linear array of holes 18f as seen in FIG. 2. Again, a small chain 48 may secure pin 44 via latch arm 44a to a flange, such as flange 62 mounted to hook collar 34a.

A rigid inclined hook assembly 34b is rigidly mounted as by welding to the bottom of hook collar 34a so as to depend downwardly therefrom. Hook assembly 34b may be inclined so as to narrow the hook opening 34c so as to let D-ring 8a narrowly pass through opening 34c so as to be releasably retained on hook assembly 34b. Thus with D-ring 8a hooked onto hook assembly 34b, tarp 8 is suspended from hook assembly 34. Thus with tarp 8 hooked to all six of hook assemblies 34, tarp 8 is suspended beneath frame 10 for elevation by the forklift and placing over a load on a flatbed trailer. Once the tarp has been placed over the load, a pole 64 may be employed by operator to unhook D-rings 8a from their corresponding hooks 34b to thereby allow the tarp to settle onto the load.

As seen in FIGS. 8a and 8b, for the application of straps to a load frame 10 may also be adapted to carry straps 66 so as to position the straps over the load and so as to drop the straps onto the load in their desired positions.

Frame 10 is adapted for supporting straps 66 by stringing a pair of cables 68 longitudinally along frame 10 so that a cable 68 is strung along opposite sides of frame 10 between hook assemblies 34. Thus, a first cable 68 is strung along a first side 10a of frame 10 with cable 68 attached to hook assemblies 34. On the opposite side 10b of frame 10 a second cable 68 is strung and mounted to the corresponding hook assemblies 34.

Straps 66 may be then looped over cables 68, and so long as straps 66 pass under the longitudinal support tubes 26 of frame 10, frame 10 may be elevated above the flatbed load on forklift 12 and then positioned over the load so that the cable

68 may be released from hook assemblies 34 so as to fall to the ground on either side of the flatbed trailer thereby allowing straps 66 to settle down onto the load with their free ends on the opposite sides of the trailer. Straps 66 may then be tensioned by conventional tensioning means on the trailer to tighten the straps down onto the load.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A tarping or strapping system for placing a tarp having four opposite corners or straps down onto a load on a flatbed trailer, the system comprising:
    a beam having opposite first and second ends and adapted to be mountable at said first end of said beam to a fork carriage of a forklift so as to be elevatable along with the carriage upon elevation of the carriage,
    an oppositely disposed pair of rigid elongate primary support members, each having opposite first and second ends, mounted at said first ends to said beam so as to extend perpendicularly and substantially horizontally therefrom in oppositely disposed directions,
    a pair of rigid, elongate secondary support members mounted at said second ends of each of said primary support members so as to extend therefrom substantially parallel with said beam and substantially co-planar with said beam and said primary support members, said pair of secondary support members having opposite distal ends on each secondary support member of said pair of secondary support members,
    tarp suspension means mounted on said distal ends of said secondary support members for suspending the four opposite corners of the tarp therefrom so as to suspend the tarp below said beam, and said primary and secondary support members.

2. The system of claim 1, wherein said tarp suspension means includes a rigid depending member at each of said distal ends for hooking onto mounts on corresponding corners of the tarp.

3. The system of claim 2 wherein each said depending member is a hook.

4. The system of claim 1 wherein said pairs of secondary support members are pairs of linear arms.

5. The system of claim 1 wherein said beam is linear, and wherein each of said pairs of primary support members are co-linear and wherein each of said pairs of secondary support members are co-linear.

6. The system of claim 5 further comprising mid-section tarp suspension means mounted spaced apart along said beam so as to suspend a mid-section of the tarp from said beam.

7. The system of claim 6 wherein said mid-section tarp suspension means includes a pair of rigid depending members for hooking mounts on opposite sides of the mid-section of the tarp.

8. The system of claim 7 wherein the pair of rigid upstanding-depending members are a pair of hooks.

9. The system of claim 1 wherein said beam includes a primary beam and a beam extension.

10. The system of claim 9 wherein said primary beam and said beam extension are joined at a center junction by joining means.

11. The system of claim 10 wherein said first ends of said primary support members are also mounted to said center junction by said joining means.

12. The system of claim 11 wherein said joining means is radially spaced apart array of pockets, equally radially spaced apart in a plane containing said beam and said primary support members.

13. The system of claim 12 wherein a further pair of radially spaced apart pockets form end-junctions on said second ends of said primary support members for mounting thereon of said secondary support members.

14. The system of claim 1 wherein a pair of strap support members are mounted to said tarp suspension means substantially parallel to said primary support members.

15. The system of claim 14 wherein said strap support members are elongate flexible members.

16. The system of claim 15 wherein said flexible members are cables suspended from said distal ends.

\* \* \* \* \*